O. M. MORSE.
DUST COLLECTOR.
APPLICATION FILED JULY 10, 1909.
942,657.
Patented Dec. 7, 1909.
2 SHEETS—SHEET 2.
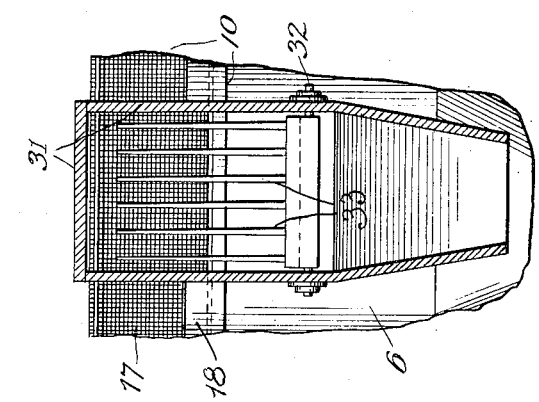
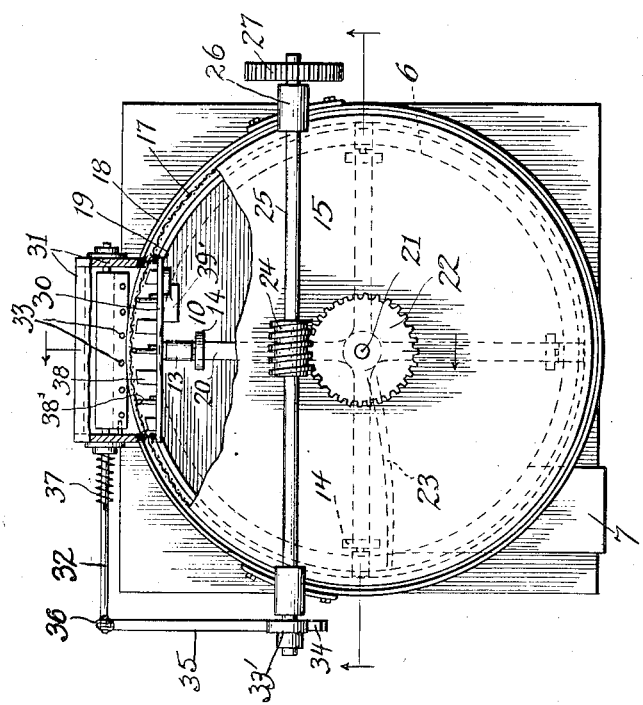

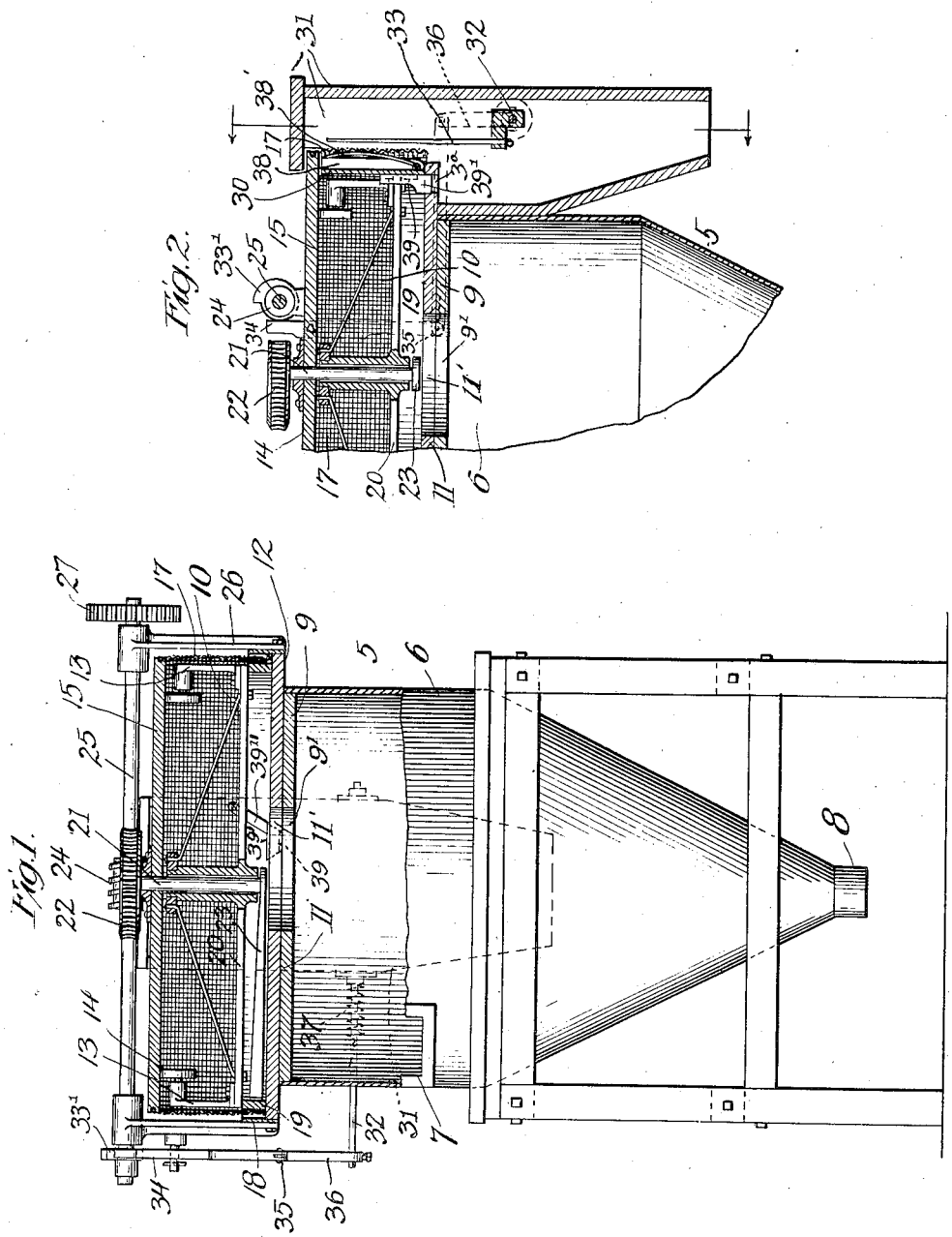

UNITED STATES PATENT OFFICE.

ORVILLE M. MORSE, OF JACKSON, MICHIGAN.

DUST-COLLECTOR.

942,657. Specification of Letters Patent. Patented Dec. 7, 1909.

Application filed July 10, 1909. Serial No. 506,937.

*To all whom it may concern:*

Be it known that I, ORVILLE M. MORSE, a citizen of the United States, residing at Jackson, in the county of Jackson and State of Michigan, have invented certain new and useful Improvements in Dust-Collectors, of which the following is a specification.

My invention relates to improvements in dust collectors, and has for its general object to provide a dust collector wherein the bulk of material is separated from the air in a centrifugal machine and the leakage from the centrifugal machine is arrested in a filtering collector connected to receive such leakage from the centrifugal-collector outlet.

In the drawings, Figure 1 is a side elevation, with parts in section, of a machine embodying my invention; Fig. 2 is an enlarged sectional view of parts of the fabric separator and the dust discharge spout therefor, taken on line 3—3 of Fig. 3. Fig. 3 is a plan view of the machine with parts broken away; and Fig. 4 is a detail section on line 4—4 of Fig. 2.

In the construction shown, 5 indicates in general a centrifugal dust collector whereof 6 is the casing of any usual or preferred construction providing a tangential inlet 7, a bottom dust discharge 8, and a top deck 9 having therein the air-outlet opening 9'. The structure of the centrifugal dust collector may be of any desired type and does not *per se* form any part of my invention.

In any suitable position to receive the centrifugal-collector leakage, preferably upon the deck 9, is mounted a filtering dust-collector structure of turret form, generally indicated at 10, and comprising, in the embodiment shown, a base 11 of larger diameter than the deck 9 of the centrifugal collector so as to provide an overhanging ledge 12 throughout its periphery and open at inlet 11' to the centrifugal-collector outlet 9'. Above the base 11 are arranged the supports 13, carrying at a suitable elevation rollers 14, upon which is rotatively mounted a head 15 of slightly less diameter than the base 12 and having secured at its periphery an endless depending filtering skirt or wall 17, preferably of coarse, hairy fabric, such as burlap of one or more thicknesses, free at its lower end and extending down in proximity to the base 11. Upon the base 11 in close proximity to the outer side of the skirt or wall 17 is disposed a low guard rail 18 for guiding the skirt circularly and preventing the free passage of air under the lower edge of the skirt, and a similar inner wall 19 may be and preferably is also provided.

For centering the head 15 and for giving it rotation, I provide a structure embodying a spider 20, preferably carried, as may also be the supports 13, upon the inner wall 19, and giving bearing centrally to a shaft 21, rotarily and vertically fixed to the head 15 and bearing at a suitable point a worm wheel 22. The lower end of the shaft 21 also carries a horizontally flexible sweep 23, passing just above the base 11 for a purpose to be described. The worm wheel 22 is suitably driven as by a worm 24 mounted upon a power shaft 25 suitably positioned in bearing standards 26 mounted on the base 11, said shaft bearing suitable driving means such as the pulley 27. Thus it will be obvious that rotation of the power shaft 25 will occasion slow rotation of the head 15 carrying with it the skirt 17.

For removing the dust gathered in the skirt 17 therefrom, I provide a cleaner mechanism for operating upon a small continually changing portion of the moving skirt and a cleaning chamber for handling the dust cleaned from the fabric. Specifically I provide at any suitable point upon the machine, in close proximity to the inner side of the skirt, a straight backing wall 30 of rigid construction mounted upon the base 11, extending up to head 15 and forming a flat chord of the inner wall 19. Just outside of this back wall, I arrange a structure 31, which with the said wall 30 forms a cleaning chamber and interiorly affords space for the play of the whips, preferably employed for cleaning as will be described. Below the level of the base 11, the cleaning chamber extends in under the ledge of the base 11 and down the exterior of the casing 6, as a chute open at its lower end.

As best shown in Fig. 3, the inner edges of the side walls of the chamber 31 are just sufficiently removed from the backing wall 30 thereof to permit the passage of the skirt 17, the slit left for this purpose being preferably edged with a packing material, so that, with the fabric interposed between the back wall 30 and the side walls of the chamber 31, said chamber is practically closed from communication with the interior of the fabric collector. Thus, I provide in general a farbric-walled collector-chamber and a cleaning chamber non-communicating therewith, arranged for the passage of a portion of the fabric wall through said cleaning chamber at all times.

Extending transversely through the chamber 31 is a rock shaft 32 bearing pliant whips or fingers 33, of ratan or the like, which, when the shaft is oscillated, beat directly upon the portion of the skirt within the cleaning chamber 31, rocking motion or oscillation being imparted to said shaft 32 by a suitable connection thereof with the power shaft 25. In the specific construction shown, the power shaft 25 has a cam 33', operating upon a pivoted lever 34 which has a link connection 35 with a crank arm 36 connected to the rock shaft 32 which also bears a spring 37 pressing in the direction to throw the beaters toward the fabric. I also preferably provide on the wall 30, strips 38 and spring fingers 38' for holding the fabric out from the wall as it passes through the cleaning chamber. Now it will be observed that during each rotation of the shaft 25, the cam 33' imparts motion to the lever system to throw the rock shaft backward against the tension of its spring and then to release the lever system so that the rock shaft may be thrown forward by the spring and the beaters caused to strike upon the skirt portion within the dust chute to clean it. If desired, air connections may be provided for the cleaning chamber to pass air through the fabric segregated in said chamber, but such provision is not generally necessary. Further, for the removal of such dust as may accumulate within the fabric collector upon the base 11, I provide in the overhanging ledge 12 in register with the cleaning chamber 31 a dust escape opening 39 overlain by a valve 39', preferably gravity operated to close the opening and arranged to be lifted by the sweep 23, which is so shaped as, in its passage just above the base 11, constantly to direct any dust accumulation toward the periphery and, upon raising the valve, to push the dust into the open orifice 38 for escape into the dust chute 31. The yielding construction of the sweep enables it to follow the contour of the inner wall 19 and the flat wall 30, and the valve 39' has a stem 39'' pivoted at its end and inclined, as shown in Fig. 1, so that the sweep lifts the valve in passing.

In the operation of the machine, dust laden air driven into the inlet 7 has the bulk of the material removed therefrom by the action of the centrifugal separator 5, but a certain proportion of the light, practically-impalpable or floating dust is incapable of such separation and escapes with the outgoing air through the orifices 10, 10', into the appropriately disposed fabric-walled secondary chamber. The large spread of coarse fabric provided affords adequate capacity to permit the air to escape freely and with low velocity at all times if the fabric is kept fairly clean, and yet the fabric operates easily to arrest the dust which would otherwise escape with the air, the fabric employed for this purpose being preferably coarse burlap or jute cloth, which collects dust well and cleans easily.

In the operation of the machine, the turret is constantly and uniformly rotated and fresh portions of the endless fabric wall or skirt, free at its bottom and unstretched or loose peripherally, constantly brought within the confines of the cleaning chamber and there whipped by the whips 33 as it passes gradually through the chamber, so causing the dust to be whipped from the cloth and to pass through the dust chute for ultimate delivery apart from the material caught in the centrifugal machine. At the same time, any dust which may settle upon the base 11 is constantly being gathered by the sweep 23 and removed to the exterior cleaning chamber through the valve opening 39.

While I have herein described in some detail a particular embodiment of my invention, it will be apparent to those skilled in the art that many changes in the details of construction might be made without departure from the spirit and scope of my invention, and

What I claim and desire to secure by Letters Patent is:

1. The combination with a centrifugal dust collector having an air outlet, of a filtering collector having its inlet connected with said outlet, providing a rotatable element having an endless peripheral skirt of filtering material suspended from its upper edge and free at its lower edge through which the air must pass in escape, means for segregating a continually changing portion of said skirt from communication with the interior of the filtering collector, and means for cleaning the segregated portions of the skirt.

2. The combination with a centrifugal dust collector having an outlet opening, of a filtering collecting element disposed with reference to said centrifugal dust collector to receive leakage therefrom, said element having a continuous peripheral suspended wall of fabric free at its lower edge, means for rotating the said fabric wall, a cleaning chamber substantially segregated from the interior of said element, through which a continually changing portion of the fabric wall passes, and means within said cleaning chamber for directly whipping the fabric therein contained.

3. The combination with a centrifugal dust collector having an outlet in its top, of a fabric collecting-chamber structure superposed upon the centrifugal collector providing a suitable head, a peripheral fabric wall depending from said head and free at its lower edge, and unstretched peripherally, means for rotating said head and wall, a cleaning chamber through which a continually changing portion of the fabric wall passes, and means for cleaning the contained portion of said fabric wall.

4. The combination with a centrifugal dust collector, of a fabric collector connected therewith, providing a rotatable peripheral fabric wall, suspended at its upper edge and free at its lower edge, a retaining wall with which the lower edge of said fabric coacts, a cleaning-chamber structure through which a changing portion of the fabric wall passes, and means for cleaning the portion of the fabric wall contained within said cleaning chamber.

5. The combination with a centrifugal dust collector, of a horizontal turret structure superposed thereon, the continuous peripheral wall of said turret being of fabric unstretched and free at its lower edge, means for rotating said fabric wall, a cleaning chamber through which a continually changing portion of said wall passes, having an opening to the interior of the turret, means within the cleaning chamber for cleaning the portion of the fabric therein, and means within the turret for forcing material accumulating on the bottom thereof into the cleaning chamber through said opening thereto.

6. The combination with a centrifugal dust collector, of a horizontal chamber structure superposed thereon of greater diameter than the dust collector providing an overhanging ledge, the peripheral wall of said chamber being of fabric, means for rotating said fabric wall, a cleaning chamber through which a continually changing portion of said wall passes, said chamber extending under the overhanging ledge of the dust collecting chamber, means within the cleaning chamber for whipping the portion of the fabric wall therein, there being an opening from said cleaning chamber through the ledge into the fabric dust collecting chamber, a valve for said opening, and means for sweeping dust through said opening arranged automatically to operate said valve.

7. The combination with a centrifugal dust collector, of a superposed screening structure comprising a head, means supporting and guiding said head for rotation, a fabric skirt depending from said head free at its lower edge, a cleaning chamber through which a changing portion of said fabric wall passes, whippers within said cleaning chamber, and power driven means for rotating the head and operating the whippers.

8. In a dust collector, a filtering agent, comprising a body of fabric having an open but fibrous mesh with the fibers loosely obstructing the mesh-openings, as coarse jute burlap, means suspending said agent in a path for dust laden air with its lower end loose and unstretched, and means for whipping said agent.

In testimony whereof I hereunto set my hand in the presence of two witnesses.

ORVILLE M. MORSE.

Witnesses:
JOHN L. BENTLEY,
WILLIAM B. KNICKERBOCKER.